United States Patent

Yoshino et al.

[15] 3,646,329

[45] Feb. 29, 1972

[54] ADAPTIVE LOGIC CIRCUIT

[72] Inventors: Hirokazu Yoshino; Tomio Yoshida, both of Osaka, Japan

[73] Assignee: Matsushita Electric Industrial Co., Ltd., Osaka, Japan

[22] Filed: Nov. 13, 1969

[21] Appl. No.: 876,269

[30] Foreign Application Priority Data

Nov. 20, 1968 Japan....................................43/85735

[52] U.S. Cl.........................235/150.1, 235/150.53, 307/205, 340/146.3 T

[51] Int. Cl..........................................................G05b 13/02

[58] Field of Search.................235/150.1, 181, 150, 150.53; 340/172.5, 347 DA; 307/211, 205

[56] References Cited

UNITED STATES PATENTS

| | | | |
|---|---|---|---|
| 3,209,328 | 9/1965 | Bonner | 340/172.5 X |
| 3,262,101 | 7/1966 | Halpern | 340/172.5 |
| 3,341,823 | 9/1967 | Connelly | 340/172.5 |
| 3,408,627 | 10/1968 | Kettler et al. | 340/172.5 |
| 3,435,422 | 3/1969 | Gerhardt et al. | 235/150.1 X |
| 3,462,588 | 8/1969 | Hussey | 235/150.53 |
| 3,492,470 | 1/1970 | Gorbatenko | 235/181 |
| 3,508,249 | 4/1970 | Gordon | 340/347 |

OTHER PUBLICATIONS

Hattaway et al.: Training a machine to read with nonlinear threshold logic ELECTRONICS, Aug. 22, 1966, pages 86–93

*Primary Examiner*—Felix D. Gruber
*Attorney*—Stevens, Davis, Miller & Mosher

[57] ABSTRACT

An adaptive logic circuit which is a basic component circuit of a learning machine. A voltage divider comprising a variety of parallel resistances and a common resistance connected in series thereto gives weighting constants one of which is to be selected by applying outputs of respective stages of a shift register to the gates of MOS field effect transistors connected between the respective resistances and the common resistance. The MOS field effect transistor whose control terminal is supplied with an input signal becomes conductive thereby providing a threshold function. This circuit can be formed entirely of solid state elements, enabling the electronic setting of weights so that the learning processes can be performed at very high speed.

3 Claims, 12 Drawing Figures

H. YOSHINO & T. YOSHIDA
INVENTORS

BY Stevens, Davis, Miller & Mosher
ATTORNEYS

ADAPTIVE LOGIC CIRCUIT

This invention relates to an adaptive logic circuit and more particularly to an adaptive logic circuit which can rapidly select a proper weight in a purely electronic and digital manner.

The adaptive logic circuit, being different from other logic circuits, has such a function that the relation between the input and the output can be arbitrarily selected by changing the values of weights included in the circuit. Namely, an adaptive logic circuit can perform OR, AND and other logical operation by the adjustment of weights.

A detailed description will be made with reference to the accompanying drawings in which.

Figure 7:
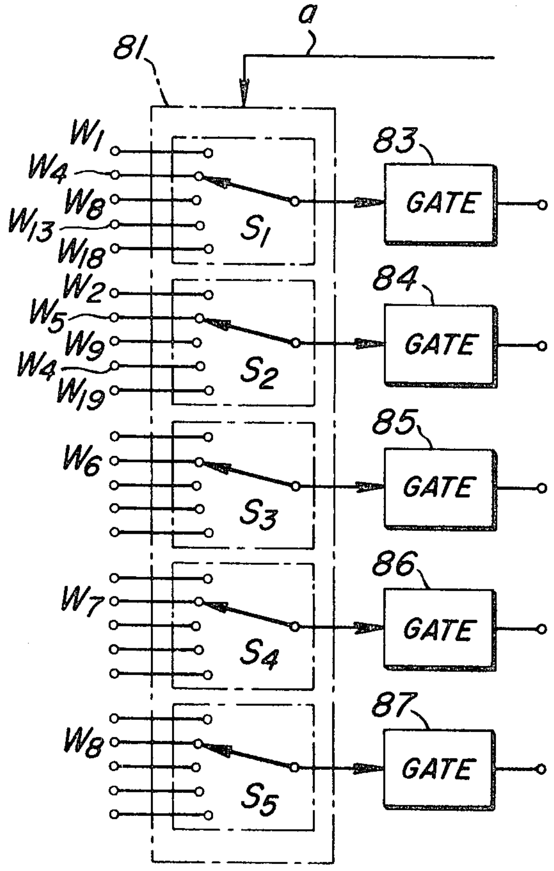
Figures 4A, 4B, 4C, 4D, 4E, 4F:
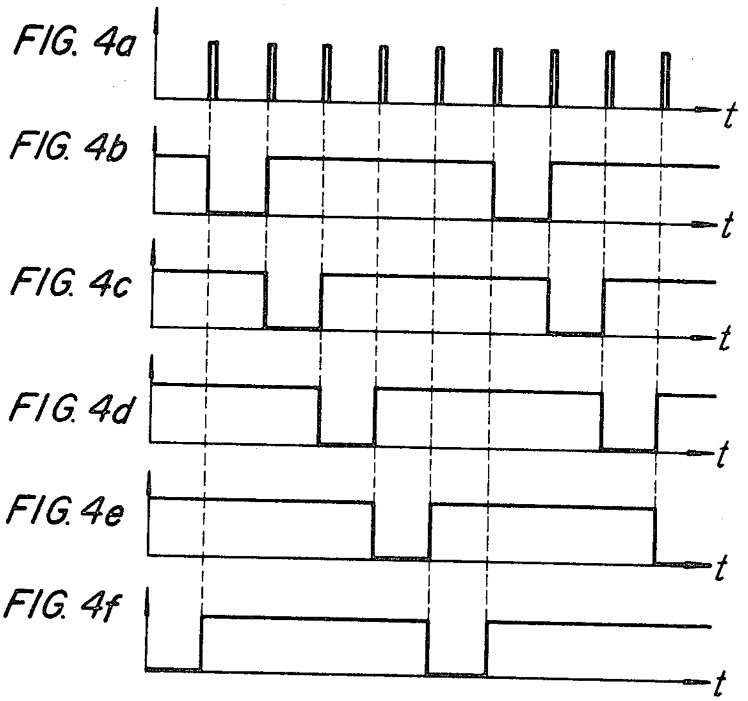
Figure 5:
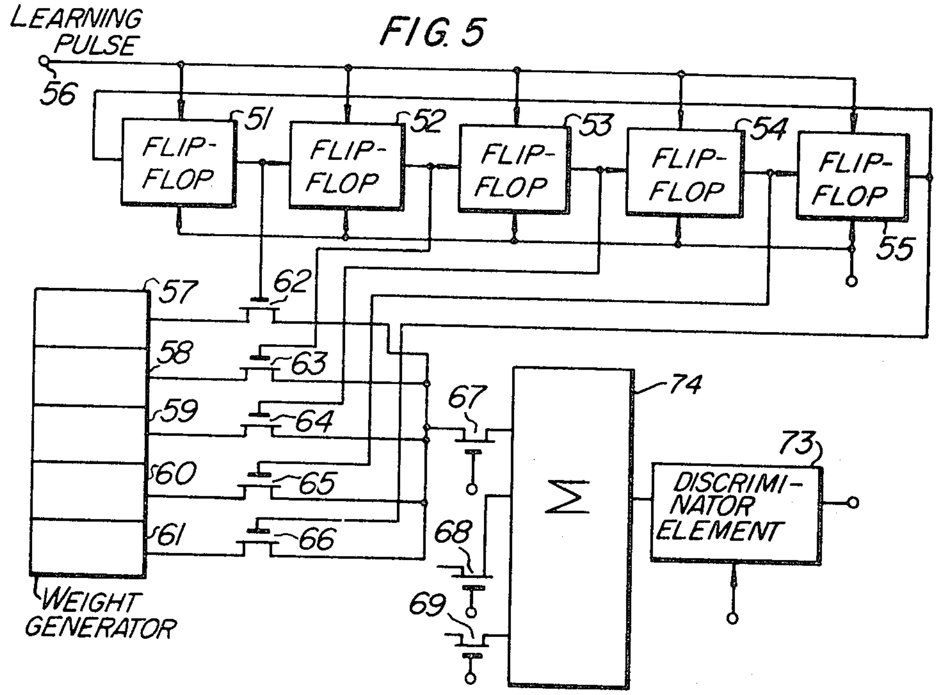
Figure 6:
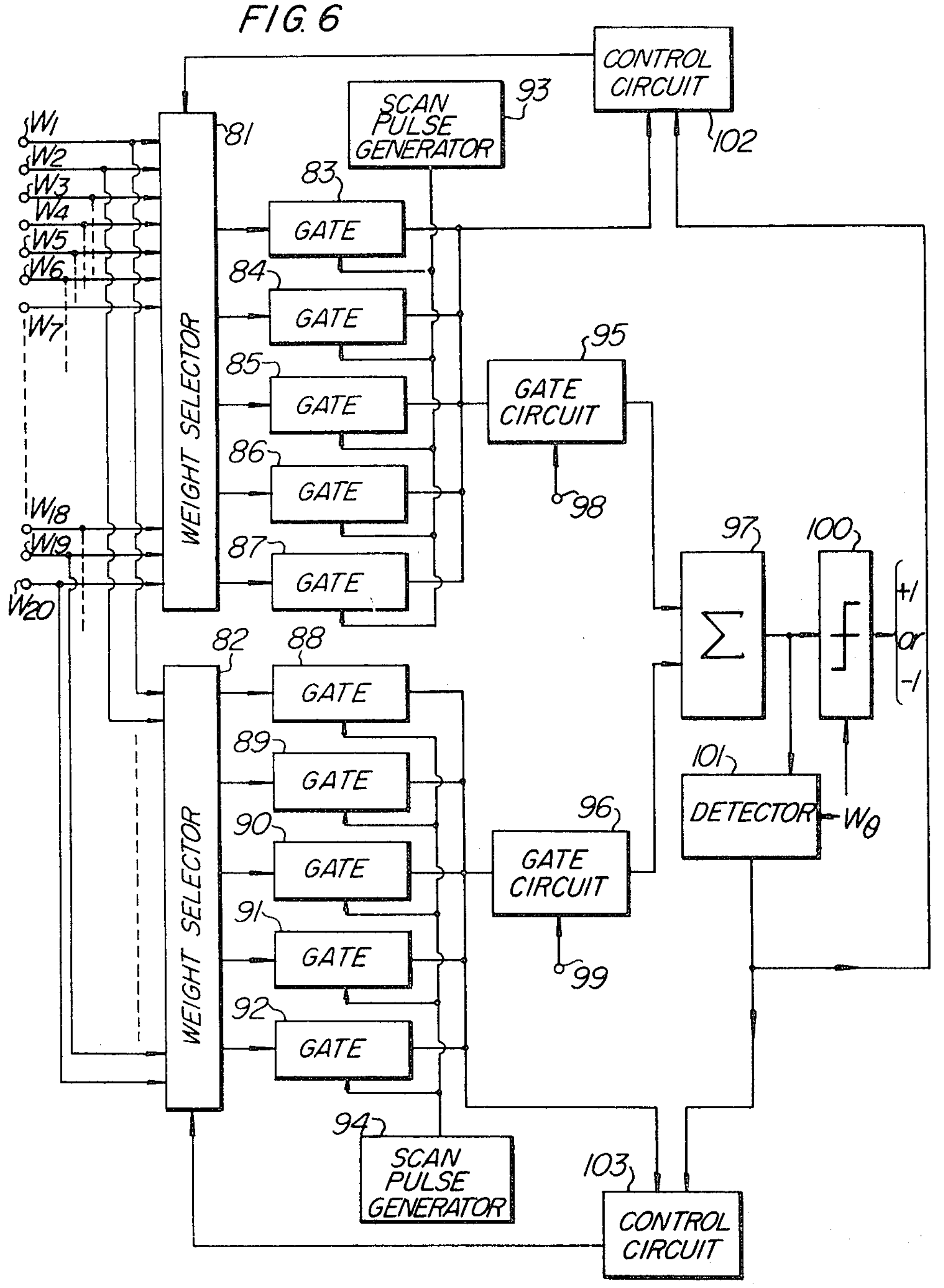

FIGS. 4*a* to 4*f* show pulse trains generated from the shift register of the circuit;

FIGS. 5 and 6 show different adaptive logic circuits embodying the present invention; and FIG. 7 shows the construction of the weight selectors.

Figures 1, 2:
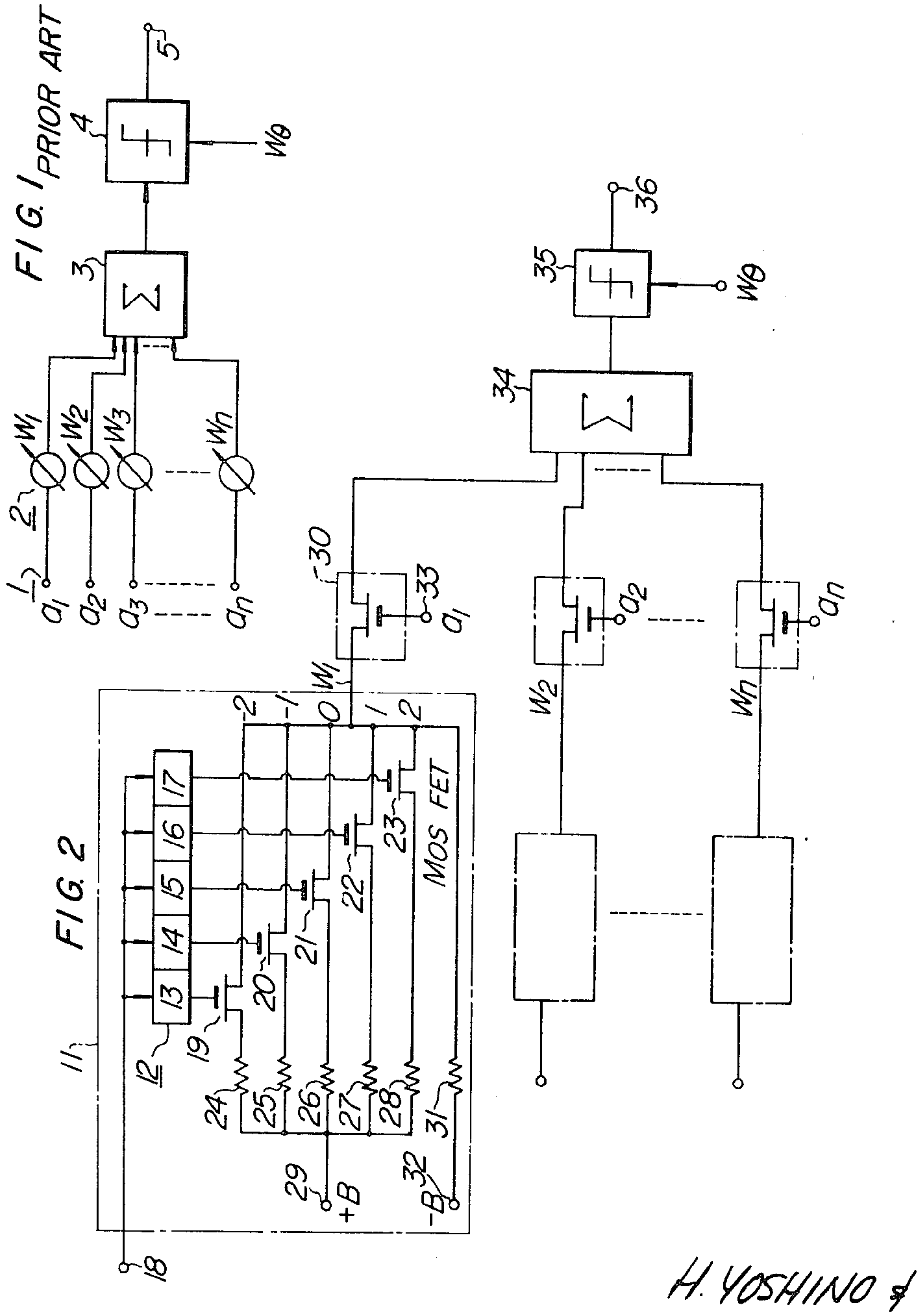
FIG. 1 PRIOR ART, FIG. 2
FIG. 1 is a block diagram of a basic adaptive logic circuit.
FIG. 2 is a block diagram of an embodiment of the adaptive logic circuit of the invention.

FIG. 1 shows the basic components of an adaptive logic circuit comprising $n$ input terminals 1 having respective inputs $a_l$ to $a_n$ applied thereto n weighting elements 2 of weights $W_l$ to $W_n$, a summing circuit 3, a discriminator circuit 4 and an output terminal 5. Inputs $a_l$ to $a_n$ respectively take either one of "+1" and "0" which are multiplied with corresponding weights $W_l$ to $W_n$ at the weighting elements 2 and then summed up at the summing circuit 3 to give an output of $$\sum_{i=1}^{n} a_i W_i.$$

The discriminator circuit 4 compares this output $$\sum_{i=1}^{n} a_i W_i$$

of the summing circuit with a threshold value $W_\theta$ and gives an output of "+1" at the output terminal 5 when $$\sum_{i=1}^{n} a_i W_i > W_\theta$$

and an output of "0" when $$\sum_{i=1}^{n} a_i W_i < W_\theta.$$

Thus, combinations of inputs $a_l$ to $a_n$ are classified into two groups of "+1" and "0" in combination with the group of weight multipliers $W_l$ to $W_n$. This classification operation can be modified by the selection of weights $W_l$ to $W_n$.

In the circuit arrangement shown in FIG. 1, a number of weighting elements ($W_1$, to $W_2$ ... $W_n$) becomes necessary as the number of input signals ($a_1, a_2 ... a_n$) is increased. Conventionally, potentiometers, memistors or magnetic cores have been used as such elements to give the weights of an adaptive logic circuit. However, all of these elements are large in size or analog in their weight setting so that they are disadvantageous in that the volume of the adaptive logic circuit becomes too great or that the setting of the weights becomes troublesome.

This invention eliminates such problems inherent to the conventional weighting elements and provides a circuit formed in such a manner that the weights can be purely electronically and digitally selected. The present invention will hereinafter be described in conjunction with FIGS. 2 to 7.

FIG. 2 shows an embodiment of the invention in which a weight can be set at five degrees. The adaptive logic circuit comprises circuits 11 for giving weights $W_l$ to $W_n$, gate circuits 30 with input terminals 33 having inputs $a_l$ to $a_n$ applied thereto, a summing circuit 34, a discriminating circuit 35 and an output terminal 36. The weighting circuit 11 comprises a shift register 12 formed of five flip-flop circuits 13 to 17 and operated by a learning pulse supplied at a terminal 18, MOS field effect transistors 19 to 23 with their gates connected to the respective flip-flop circuits 13 to 17, one electrode connected to a common +B terminal through respective resistances 24 to 28, and the other electrodes connected to a common terminal of the circuit 11 and then to a −B terminal 32 through a resistance 31. The gate circuit 30 is, for example, formed of an MOS field effect transistor having an input applied to its gate electrode. The outputs of the gate circuits are connected to the summing circuit 34 to be summed together. The discriminating circuit 35 compares the output of the summing circuit 34 with a threshold value $W_\theta$ to give an output of "-30 1" or "0" in accordance with the classification, as is described above.

Figure 3:
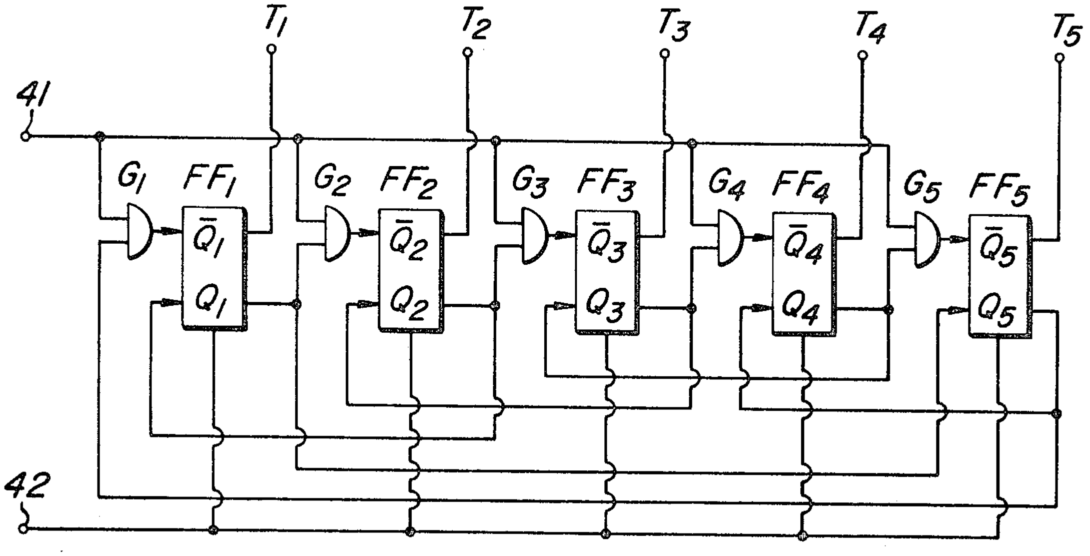
FIG. 3 is a block diagram of a shift register used in the circuit of FIG. 2.

The shift register or ring counter 12 used in the weighting circuit 11 is shown in more detail in FIG. 3.

In FIG. 3, the shift register is formed of five flip-flop circuits. A clock pulse is supplied from a terminal 41 to the $\overline{Q}$ inputs of the flip-flop circuits $FF_1$, $FF_2$ ... $FF_5$ through gate circuits $G_1$, $G_2$ ... $G_5$. The $\overline{Q}$ outputs of the flip-flops are connected respectively to the output terminals $T_1$ to $T_5$ from which conducting signals are supplied to the MOS field effect transistors 19 to 23 of FIG. 2. The Q inputs of the flip-flops $FF_1$ to $FF_5$ are connected respectively to the Q outputs of the following stage, respectively. The Q outputs are further connected to the gate circuits of the following stage, respectively. Numeral 42 indicates a voltage supply terminal.

Suppose now that the $\overline{Q}$ output of the first stage flip-flop $FF_1$ is at a low level and that the $\overline{Q}$ outputs of the other flip-flops $FF_2$ to $FF_5$ are at a high level. The $Q_1$ output of the flip-flop $FF_1$ is at a high level and applied to the input of the gate circuit $G_2$. The Q outputs of the other flip-flops $Q_2$ to $Q_5$ are at a low level and the gate circuits other than the gate circuit $G_2$ have no inputs applied thereto. When a clock pulse is supplied from the terminal 41 to the circuit of such state, the gate circuit $G_2$ is supplied with the clock pulse and the output $Q_1$ to give an output which converts the state of the next flip-flop stage. That is, the $Q_2$ output goes to a high level and the $\overline{Q}_2$ output changes to a low level. The $Q_2$ output is applied to the $Q_1$ input of the preceding flip-flop $FF_1$ to convert the $\overline{Q}_1$ output to a high level and the $Q_1$ output to a low level. The above operation is repeated by the successive supply of clock pulse to shift the low-level state of the Q outputs. The output terminals $T_1$ to $T_5$ are supplied with such outputs as is shown in FIGS. 4*b* to 4*f*.

In the circuit of FIG. 2, resistances 24, 25, 26, 27, 28 and 31 have respective values of $R_1$, $R_2$, $R_3$, $R_4$, $R_5$ and $R_o$ and set the weights. Provided that voltages of +B and −B are applied to the terminals 29 and 32, these resistances are chosen as follows:

$$R_1 = \frac{B+2}{B-2} R_o,$$

$$R_2 = \frac{B+1}{B-1} R_o,$$

$$R_3 = R_o,$$

$$R_4 = \frac{B-1}{B+1} R_o,$$

and $$R_5 = \frac{B-2}{B+2} R_o.$$

Then, if the MOS field effect transistor 19 is made conductive by the output of the flip-flop 13 with other MOS field effect transistors being cut off, an output voltage corresponding to −2 appears at the output terminal of the weighting circuit 11. Similarly, when the MOS field effect transistor 20, 21, 22 or 23 is made conductive, an output voltage corresponding to −1, 0, +1 or +2 appears at the output terminal, respectively. This voltage serves as a weight $W_1$.

When an input of $a_1$ is applied to the input terminal 33 of the gate circuit 30, a voltage of $a_1 W_1$ will be supplied to the input terminal of the summing circuit 34. The summing circuit 34 sums up the voltages appearing at the $n$ input terminals and supplies an output of $$\sum_{i=1}^{n} a_i W_i$$

to the discriminating circuit 35 which compares $$\sum_{i=1}^{n} a_i W_i$$

with a threshold value $W_\theta$ and generates an output of "+1" or "0" according to the inequality relation as described before.

As is clear from the foregoing description, in the adaptive logic circuit of the above structure, weights can be selected electronically and digitally, so that constructing a learning machine by utilizing an adaptive logic circuit having the above-described construction will greatly facilitate the selection of weights in the course of learning.

FIG. 5 shows an example of the circuit of FIG. 2 in which flip-flops 51 to 55 are connected in cascade so as to operate as a ring counter with an input terminal 56 for supplying a learning pulse. The learning pulse from the terminal 56 shifts the stable position, i.e., the position of output state "1," of the flip-flops 51 to 55 successively. Weight generators 57 to 61 generate weights of +2, +1, 0, −1, and −2. MOS field effect transistors 62 to 66 have their control gates connected to the interconnection points of the flip-flops 51 to 55, sources connected to the output terminals of the weight generators 57 to 61 and drains connected together. MOS field effect transistor 67 has its source connected to the interconnection points of the drains of field effect transistors 62 to 66 and its gate adapted for application of an input signal. MOS field effect transistors 68 and 69 are connected to respective circuits similar to that connected to the MOS field effect transistor 67. The drains of the MOS field effect transistors 67 to 69 are led to a summing circuit 74 which, in turn, is connected to a discriminator circuit 73. The discriminator circuit 73 is a kind of comparator which compares the input from the summing circuit 74 with a threshold value $W_\theta$.

Now, the operation of the circuit of FIG. 5 will be described. Turning on the power source or resetting makes the state of the flip-flops 51 to 55 [1, 0, 0, 0, 0] and only the flip-flop 51 generates an output. When a learning pulse arrives at the terminal 56, the stable state of the circuit shifts to the right in the figure by one stage and only the flip-flop 52 generates an output. Thus, each pulse at the terminal 56 shifts the stable position of the circuit to the right by one stage and consequently the output is also shifted to the right. The outputs of the flip-flop 51 to 55 are supplied to the gates of the MOS field effect transistors 62, 63, 64, 65 and 66 respectively to make one of them conductive so as to supply a desired weight to the MOS field effect transistors 67. When an input signal (corresponding to the signals $a_1, a_2 \ldots a_n$ in FIG. 1) enters the gate of the transistor 67, it makes the transistor conductive to apply the weight to the discriminating circuit 73. Similarly, other MOS field effect transistors 68 and 69 are supplied with weights and supply them to the discriminating circuit 73 upon the arrival of input signals. The discriminating circuit 73 compares the sum of the inputs with a threshold value to generate an output of ±1 at its output terminal.

FIG. 6 shows another example of the logic circuit of the invention which performs a classifying operation of high accuracy. The circuit comprises the first weight selecting circuits 81 and 82, each having 20 input terminals to be applied with weights $W_1$ to $W_{20}$, gate circuits 83 to 87 and 88 to 92 connected to the output terminals of the first weight selector circuit 81 and 82. The connection between the weight selector 81 or 82 and the gate circuits 83 to 87 or 88 to 92 is selected by the weight selectors which are constituted by multiplexor circuits. Scanning pulse generator circuits 93 and 94 are formed of a ring connection of the flip-flops and select one gate circuit which is to be made conductive. Gate circuits 95 and 96 have their input terminals connected to the outputs of the gate circuits 83 to 87 and 88 to 92, respectively, and supply their outputs to a summing circuit 97. The gate circuits 95 and 96 change their conduction state according to the inputs "+1" or "−1" applied to the input terminals 98 and 99. A discriminating circuit 100 compares the output of the summing circuit 97 with a threshold value $W_\theta$. The voltage difference between the output of the summing circuit and the threshold value $W_\theta$ is detected by a circuit 101 which then sends its output signal to circuits 102 and 103 which change the connection between the input and output sides of the first weight selectors 81 and 82. Initially, in the first weight selectors 81 and 82, respectively, as will be described hereunder, the gates 83 and 88 are connected with the weight $W_1$, the gates 84 and 89 with the weight $W_5$, the gates 85 and 90 with the weight $W_{10}$, the gates 86 and 91 with the weight $W_{15}$, and the gates 87 and 92 with the weight $W_{20}$. This adaptive logic circuit is first educated in this state to perform the desired classification of the input patterns by the learning pulses as described in conjunction with FIG. 2. Suppose that the gate 85, i.e., the weight $W_{10}$, is selected for the input applied to the terminal 98 of the gate 95 and the gate 91, i.e., the weight $W_{15}$, is selected for the input applied to the terminal 99 of the gate 96 in response to an input pattern and that the gates 86 and 91 are selected in response to another input pattern. This is possible since the weights are set at discrete values and the number of which is limited and thus the number of discrimination functions $g(W)$ is limited. In such a case, there may occur a situation in which no suitable discrimination function exists and hence learning is never completed for a certain group of input patterns. Therefore, an expedient is resorted to wherein if the voltage difference detected at the output of the circuit 101 is found to be minimum when the weight $W_{10}$ is selected among the weights $W_1$, $W_5$, $W_{10}$, $W_{15}$ and $W_{20}$ in response to an input applied to the terminal 98, the circuit 102 will renew the connection of the weights in the weight selector 81 to connect the weight $W_{10}$ and its neighbors $W_{11}$, $W_{12}$, $W_{13}$ and $W_{14}$ to the gates 85, 83, 84, 86 and 87 and that the learning process will be repeated to obtain the desired classification based on this input pattern. By such procedure, the weight to be multiplied with an input applied to the terminal 98 can be finely altered and thus the gradient of the discriminating function can be accurately selected to give a better classification operation. In the above manner, the weight selection proceeds from a rough one to a fine one to complete learning.

As is described hereinbefore, according to the invention, weights are set by the dividing ratio of the resistance, as shown in FIG. 2, and respective gates corresponding to these weights are successively opened and closed with pulses so that the weights can be digitally selected and the selecting operation can be done electronically as shown in FIG. 2. The construction shown in FIG. 6 can incorporate both coarse selection and fine selection of weights to thereby provide a precise discrimination function.

FIG. 7 shows the construction of each of the weight selectors 81 and 82 shown in FIG. 6. Each of the weight selectors 81 and 82 is constituted by five multiplexor circuits ($S_1$, $S_2$... $S_5$) each of which, in turn, comprises five inputs and one output as schematically shown in FIG. 7. The connection between the weights ($W_1$, $W_2$ ...$W_{20}$) of the weight selector 81 and the gates 83, 84 ...87 is determined by selecting input channels of the multiplexors $S_1$, $S_2$ ... $S_5$. In the case of coarse selection of weights, the gate 83 is connected with $W_1$, the gate 84 with $W_5$, the gate 85 with $W_{10}$, the gate 86 with $W_{15}$, and the gate 87 with $W_{20}$, thereby effecting coarse selection of weights and providing a coarse discrimination function for input signals applied to the input terminals 98 and 99. The control circuit 102 decides which of the weights $W_1$, $W_5$, $W_{10}$, $W_{15}$, $W_{20}$ has formed the coarse discrimination function or which weight value is probable to contribute to the formation of a coarse discrimination function, and the output signal of the control circuit 102, which appears on a signal line *a* shown in FIG. 7, changes the internal connection of the weight selector 81. If an output signal appears on the signal line *a* indicating that the above coarse selection of weights is satisfied by the weight $W_5$ of the gate 84, for example, the multiplexor 81 operates to connect the gate 83 with $W_4$, the gate 85 with $W_6$, the gate 86 with $W_7$, and the gate 87 with $W_8$, thereby affecting finer selection of weights and providing a fine discrimination function.

What is claimed is:

1. An adaptive logic circuit comprising:

a plurality of weight selecting circuits, each weight selecting circuit including a ring counter for recirculating and generating a one output state in accordance with input pulses applied thereto, means for generating a plurality of different weighting voltages, and first gate means for applying one of said plurality of weighting voltages to a common output terminal corresponding to the position of the one output state of said ring counter;

second gate means coupled to said weight selecting circuits for gating the output signals of each of said weight selecting circuits in response to each of the input signals applied thereto;

summing means coupled to said second gate means for summing output signals of said second gate means; and comparator means coupled to said summing means for comparing an output signal voltage with a threshold voltage to generate an output signal resulting from the comparison of the magnitudes of said two voltages.

2. An adaptive logic circuit according to claim 1, wherein each of said first gate means comprises an MOS field effect transistor, and each of the output terminals of respective stages of said ring counter is connected with a control gate of a corresponding one of said MOS field effect transistors.

3. An adaptive logic circuit comprising:

a plurality of groups of weight setting logic circuit means each thereof including weight-selecting means supplied with a multiplicity of weights, first gate means respectively connected with a same number of said weights through said weight selecting means, gating pulse generating means for selectively opening said first gate means, and second gate means for gating each of the outputs of said first gate means by an input signal;

summing means coupled to said second gate means for summing the output signals of said plurality of groups;

comparator means coupled to said summing means for comparing an output signal voltage of said summing means with a threshold voltage;

means coupled to said summing means for detecting a difference between the output voltage of said summing means and the threshold voltage; and means coupled to said detecting means and said first gate means for selecting weights in each of said groups through said weight selecting means in each group by means of an output of said detecting means and an output of said first gate means in each group.

* * * * *